May 20, 1924.
W. M. ERWIN
TROUBLE LIGHT
Filed Oct. 8, 1923
1,494,596
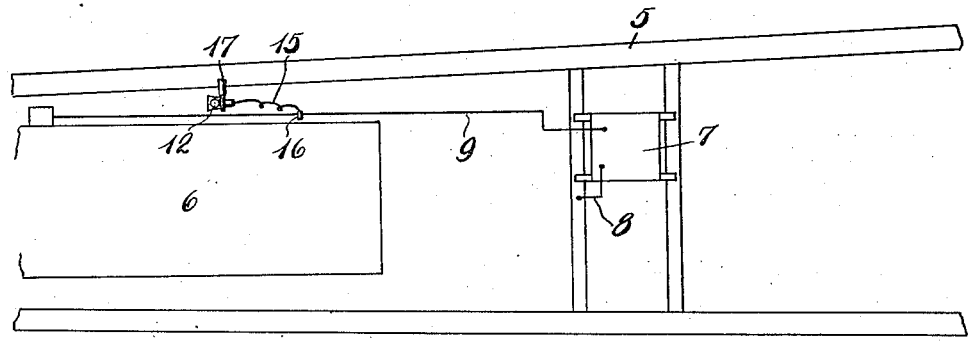
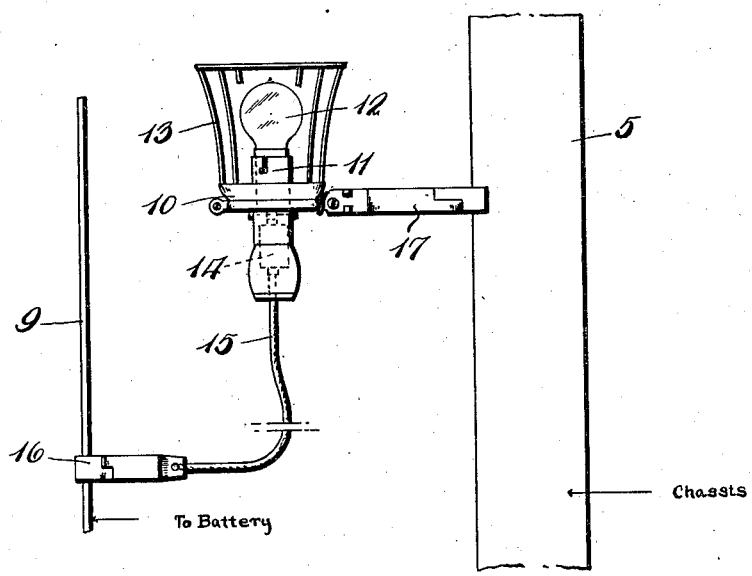
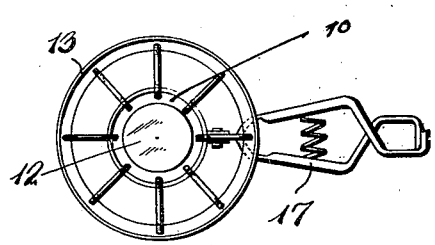
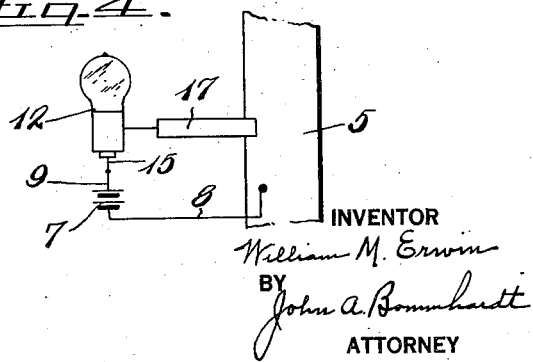
INVENTOR
William M. Erwin
BY
John A. Bornhardt
ATTORNEY Patented May 20, 1924.

1,494,596

UNITED STATES PATENT OFFICE.

WILLIAM M. ERWIN, OF CLEVELAND, OHIO, ASSIGNOR TO PLINY P. BOOTH AND PATRICK A. HALLISEY, BOTH OF CLEVELAND, OHIO.

TROUBLE LIGHT.

Application filed October 8, 1923. Serial No. 667,244.

*To all whom it may concern:*

Be it known that I, WILLIAM M. ERWIN, a citizen of the United States, residing at Cleveland, in the county of Cuyahoga and State of Ohio, have invented certain new and useful Improvements in Trouble Lights, of which the following is a specification.

This invention relates to improvements in trouble lights having for an object the provision of a trouble light particularly adapted for use around automobiles and so constructed as to permit use upon practically any part of a vehicle of the above nature.

Another object is to provide a trouble light of this character which may be attached to any part of the automobile and simultaneously with attachment, close the circuit and cause the lamp to light.

A further object is to provide a light of this character which is adapted to be illuminated by current, supplied by the usual storage battery carried by an automobile.

It is likewise an object to provide a trouble light in which one of the current conductors may be removably attached to the usual storage battery or a live wire therefrom, and afterward attaching the lamp itself to a part of the frame of the automobile, and with the last named operation close the circuit, thereby lighting the lamp.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

In these drawings:

Fig. 1 is a top plan view illustrating the manner of usage of the light upon an automobile, carrying the usual storage battery.

Fig. 2 is a detail plan view showing the manner of attachment as between the trouble light and the automobile structure.

Fig. 3 is an end view of the trouble light, and;

Fig. 4 is a diagrammatical view illustrating the electrical circuit.

Having more particular reference to the drawing throughout which like characters of reference designate like parts, this improved trouble light may be broadly stated as comprising a lamp, a bracket or clamp for attaching the lamp to any part of a support or an automobile frame, and a flexible conductor of any length desired, having at its free end means for attachment to the storage battery ordinarily carried by an automobile, or to the current conductor leading from the battery.

In Fig. 1 of the drawings, I have shown a portion of an automobile, said portion including a chassis 5, engine 6, and storage battery 7, said storage battery being grounded to the chassis 5 through a wire 8. The other side of the battery 7 has connected thereto a current conducting wire 9, which as illustrated is extended forwardly for connection to the timer or the like.

By reference to Fig. 2 the structure of the trouble light will be seen to include a frame or body portion 10, in which is mounted a socket 11, adapted for the reception of an ordinary electric light bulb 12, said bulb being protected against accidental breakage through striking a part of the automobile or the like, by the wire guard or protector 13, which is carried by the frame 10.

The opposite end of the socket 11 is adapted for the reception of a plug 14, through which connection is made as between the base of the bulb 12, and the current conductor 15, which may be of considerable length so as to permit of attachment of the light to practically any part of the automobile structure. The free end of this conductor 15, carries a clamp 16, of any desired structure, said clamp being adapted to be attached to one of the binding posts of the battery 7, or to the live wire such as 9, leading therefrom.

Carried by the frame or body portion 10 of this light, is a clamp or bracket 17, by means of which the lamp is positively attached to any part of the automobile structure, this clamp serving not only as a support for the lamp, but in addition, as a means for closing the electric circuit thereof, from the frame and wire 8.

It is quite obvious that the conductor 15, may be of any desired length, with the result that upon engaging the clamp 16 with the battery or the live wire leading therefrom, and attaching the lamp supporting clamp 17 to any portion of the automobile structure, a complete circuit will be formed and consequently light the lamp 12.

This particular construction provides a trouble light which is extremely useful in and about automobiles in that only a single length of flexible conductor is necessary and this may be of such a length that the light can be employed upon any part of the machine.

Manifestly, the construction shown is capable of considerable modification and such modification as may fall within the scope of my claims, I consider within the spirit of my invention.

I claim:

1. The combination with a support and a battery carried by the support and grounded thereon; of a portable lamp, a current conductor connecting the battery and the lamp, and a spring actuated clamp adapted for attaching the lamp to the support and simultaneously closing the circuit to light the lamp.

2. The combination with a support and a source of current supply having one side grounded upon the support; of a lamp, means for attaching the lamp to any part of the support and simultaneously form one side of a circuit and a flexible current conductor connecting the lamp and source of current supply to form the other side of the circuit and light said lamp.

3. A trouble light for use upon automobiles including a lamp, a current conductor connected to the lamp and having its free end removably attachable to the usual electrical current conductor, and a combined supporting and circuit closing clamp arranged to removably and adjustably mount the lamp upon a part of an automobile and light said lamp.

4. A trouble light of the character described, comprising a frame, a lamp carried by the frame, said frame forming a part of one circuit, a flexible conductor having connection to the lamp, a spring clip at the extremity of the conductor adapted to connect the conductor to one side of a source of current supply, and a spring actuated clamp carried by the frame, said clamp being adapted to support the lamp upon an automobile frame or the like and simultaneously close the electrical circuit.

In testimony whereof, I affix my signature.

WILLIAM M. ERWIN.